US011037457B1

United States Patent
Auger

(10) Patent No.: US 11,037,457 B1
(45) Date of Patent: Jun. 15, 2021

(54) INCENTIVE-BASED AVAILABILITY OF COMMUNICATIONS DEVICE FEATURES

(71) Applicant: Securus Technologies, Inc., Carrollton, TX (US)

(72) Inventor: Patricia Auger, Hollis, NH (US)

(73) Assignee: Securus Technologies, LLC, Carrollton, TX (US)

( * ) Notice: Subject to any disclaimer, the term of this patent is extended or adjusted under 35 U.S.C. 154(b) by 262 days.

(21) Appl. No.: 15/839,030

(22) Filed: Dec. 12, 2017

(51) Int. Cl.
*H04L 29/06* (2006.01)
*G09B 5/12* (2006.01)
*H04M 3/38* (2006.01)
*A63F 13/85* (2014.01)
*G06F 3/048* (2013.01)
*G06F 21/62* (2013.01)

(52) U.S. Cl.
CPC .............. *G09B 5/125* (2013.01); *A63F 13/85* (2014.09); *G06F 3/048* (2013.01); *G06F 21/629* (2013.01); *H04L 63/108* (2013.01); *H04M 3/38* (2013.01)

(58) Field of Classification Search
CPC ....... G09B 5/125; G06F 3/048; G06F 21/629; A63F 13/85; H04M 3/38; H04L 63/108
See application file for complete search history.

(56) References Cited

U.S. PATENT DOCUMENTS

| | | | | |
|---|---|---|---|---|
| 2005/0114192 A1* | 5/2005 | Tor | ....................... | G06Q 10/109 705/80 |
| 2008/0307339 A1* | 12/2008 | Boro | ....................... | H04L 63/08 715/764 |
| 2010/0241501 A1* | 9/2010 | Marshall | ................. | G06Q 30/00 705/14.13 |
| 2013/0065555 A1* | 3/2013 | Baker | ................... | G06Q 10/103 455/410 |
| 2014/0038546 A1* | 2/2014 | Neal | ....................... | H04M 17/10 455/405 |
| 2014/0192132 A1* | 7/2014 | Avery | ..................... | G06Q 10/10 348/14.01 |
| 2014/0278895 A1* | 9/2014 | Grimes | .............. | G06Q 30/0231 705/14.31 |
| 2015/0007307 A1* | 1/2015 | Grimes | .................... | G09B 5/08 726/18 |

(Continued)

*Primary Examiner* — Carl G Colin
*Assistant Examiner* — Hany S. Gadalla
(74) *Attorney, Agent, or Firm* — Fogarty LLP

(57) ABSTRACT

Systems, devices and methods are disclosed for controlling and incentivizing the use of software-based services that are made available to residents of controlled-environment facilities. Residents are assigned a communication device that is used to connect to a communication system provided to residents by a controlled-environment facility. Via the assigned communication device, the resident is provided with various software modules, such as visitation software, entertainment software and educational software. The provided software modules may designated as either incentivized or restricted. A restricted module, such as a visitation module or gaming module, is disabled until the resident has been authorized to use the module. The communication device is configured to track the resident's use of incentivized modules, such as education modules. The resident may enable a restricted module for a limited duration by meeting thresholds of use of an incentivized module, such completing milestones provided by the education module.

20 Claims, 3 Drawing Sheets

(56) References Cited

U.S. PATENT DOCUMENTS

| | | | |
|---|---|---|---|
| 2015/0066609 A1* | 3/2015 | Steele | G06Q 30/0207 |
| | | | 705/14.1 |
| 2015/0279158 A1* | 10/2015 | Sanford | G06Q 20/18 |
| | | | 463/25 |
| 2015/0332186 A1* | 11/2015 | Torgersrud | G06Q 10/06311 |
| | | | 705/7.13 |
| 2016/0315836 A1* | 10/2016 | Hill | H04L 63/10 |
| 2017/0178526 A1* | 6/2017 | Grimes | G09B 5/08 |
| 2018/0046818 A1* | 2/2018 | Amacker | G06F 21/629 |
| 2018/0211094 A1* | 7/2018 | Shadd | G06K 9/00114 |

* cited by examiner

INCENTIVE-BASED AVAILABILITY OF COMMUNICATIONS DEVICE FEATURES

TECHNICAL FIELD

The following description relates generally to communications devices provided to residents of a controlled-environment facility, and more particularly to using incentives to control availability of features of communications devices provided to residents of a controlled-environment facility.

BACKGROUND OF THE INVENTION

It is estimated that over two million individuals are incarcerated in U.S. prisons and jails. In general, inmates that have been convicted of felony offenses serve longer sentences in prisons (e.g., federal or state prisons), whereas inmates that have been convicted of misdemeanors receive shorter sentences that are frequently served in local jails (e.g., county jail). In addition, upon being detained by authorities, an inmate may serve significant periods of time incarcerated in a local jail while awaiting release on bond and, in some cases, while awaiting trial. During all of these periods of incarceration, an inmate may have opportunities to communicate with the outside world.

By allowing inmates to communicate with friends and family while incarcerated, the justice system aims to facilitate their transition back into society upon release. Traditional visitation sessions provided by controlled-environment facilities include telephone calls and in-person visits. More recently, technological advances have allowed controlled-environment facilities to provide other types of monitored visitation sessions, including audio conferences, video conferences, video messages, email, and online chat sessions. Traditionally, visitation sessions have been conducted using phones, terminals, kiosks, or other such devices that are installed in a fixed location, such as within a designated visitation area of the controlled-environment facility. More recently, visitation sessions may be conducted via portable communications devices issued to inmates on a temporary or permanent basis.

In addition to providing increased opportunities for visitations, additional services may be provided to inmates via an issued portable communications device. For instance, educational resources may be provided to inmates via software application installed on the portable communications device. Such educational resources may provide inmates with a variety of formal and informal educational opportunities. Inmates may also be provided with entertainment resources that may be utilized via an issued portable communications device. For instance, inmates may use an issued device to play approved video games, watch approved programs, and listen to approved music.

BRIEF SUMMARY

In accordance with various embodiments, a communications device provides services to a resident of a controlled-environment facility. The communication device includes a network interface configured to establish a connection with a resident communications system via one or more wireless access points installed within the controlled-environment facility; a memory device configured to store operating system program instructions; and one or more processors configured to execute the operating system program instructions, causing the communications device to: connect with the resident communications system to provide the resident with use of a first software module; monitor use of the first software module by the resident; determine whether use of the first software module exceeds a first threshold; enable use of a second software module by the resident, when use of the first software module exceeds the first threshold; and interoperate with the resident communications system to provide the resident with use of the second software module for a first duration.

In certain additional communication device embodiments, the first software module is an education module. In certain additional communication device embodiments, the second software module is an entertainment module. In certain additional communication device embodiments, the second software module is a visitation module. In certain additional communication device embodiments, the first duration allows the resident to participate in a visitation session with a non-resident of the controlled-environment facility. Certain additional communication device embodiments include a biometric input device configured to capture a biometric indicator presented by the resident, wherein the operating system is configured to require authentication of the resident via the biometric indicator in order to enable use of the operating system by the resident.

In accordance with various additional embodiments, a system provides a resident of a controlled-environment facility with communication services. The system includes one or more wireless access points coupled to a resident communications system; a communications device assigned to the resident, wherein the communications device is configured to connect to the resident communications system via the one or more wireless access points; and the resident communications system configured to: provide the resident with use of a first software module on the communications device; monitor use of the first software module by the resident; determine whether use of the first software module exceeds a first threshold; enable use of a second software module on the communications device by the resident, when use of the first software module exceeds the first threshold; and provide the resident with use of the second software module for a first duration.

In certain additional system embodiments, the communications device is configured to connect only to the one or more wireless access points. In certain additional system embodiments, the first software module is an education module. In certain additional system embodiments, the second software module is an entertainment module. In certain additional system embodiments, the second software module is a visitation module. In certain additional system embodiments, the first duration allows the resident to participate in a visitation session with a non-resident of the controlled-environment facility. In certain additional system embodiments, the communications device further comprises a biometric input device configured to capture a biometric indicator presented by the resident, wherein the operating system is configured to require authentication of the resident via the biometric indicator in order to enable use of the operating system by the resident.

In accordance with various additional embodiments, a method provides a resident of a controlled-environment facility with communication services. The method includes the steps of providing a wireless network within a portion of the controlled-environment facility via one or more wireless access points coupled to a resident communications system; assigning a communications device to the resident, wherein the assignment comprises configuration of the operating system of the communications device to require authentication of the resident in order to use the operating system;

configuring a connection, when the resident is authenticated, between the resident communications system and the communications device via the one or more wireless access points; providing the resident with use of a first software module on the communications device; monitoring use of the first software module by the resident; determining whether use of the first software module exceeds a first threshold; enabling use of a second software module on the communications device by the resident, when use of the first software module is determined to exceed the first threshold; and providing the resident with use of the second software module for a first duration.

In certain additional method embodiments, the communications device is configured to connect only to the one or more wireless access points. In certain additional method embodiments, the first software module is an education module. In certain additional method embodiments, the second software module is an entertainment module. In certain additional method embodiments, the second software module is a visitation module. In certain additional method embodiments, the first duration allows the resident to participate in a visitation session with a non-resident of the controlled-environment facility. In certain additional method embodiments, the communications device further comprises a biometric input device configured to capture a biometric indicator presented by the resident, wherein the operating system is configured to require authentication of the resident via the biometric indicator in order to enable use of the operating system by the resident.

BRIEF DESCRIPTION OF THE DRAWINGS

Figure 1:
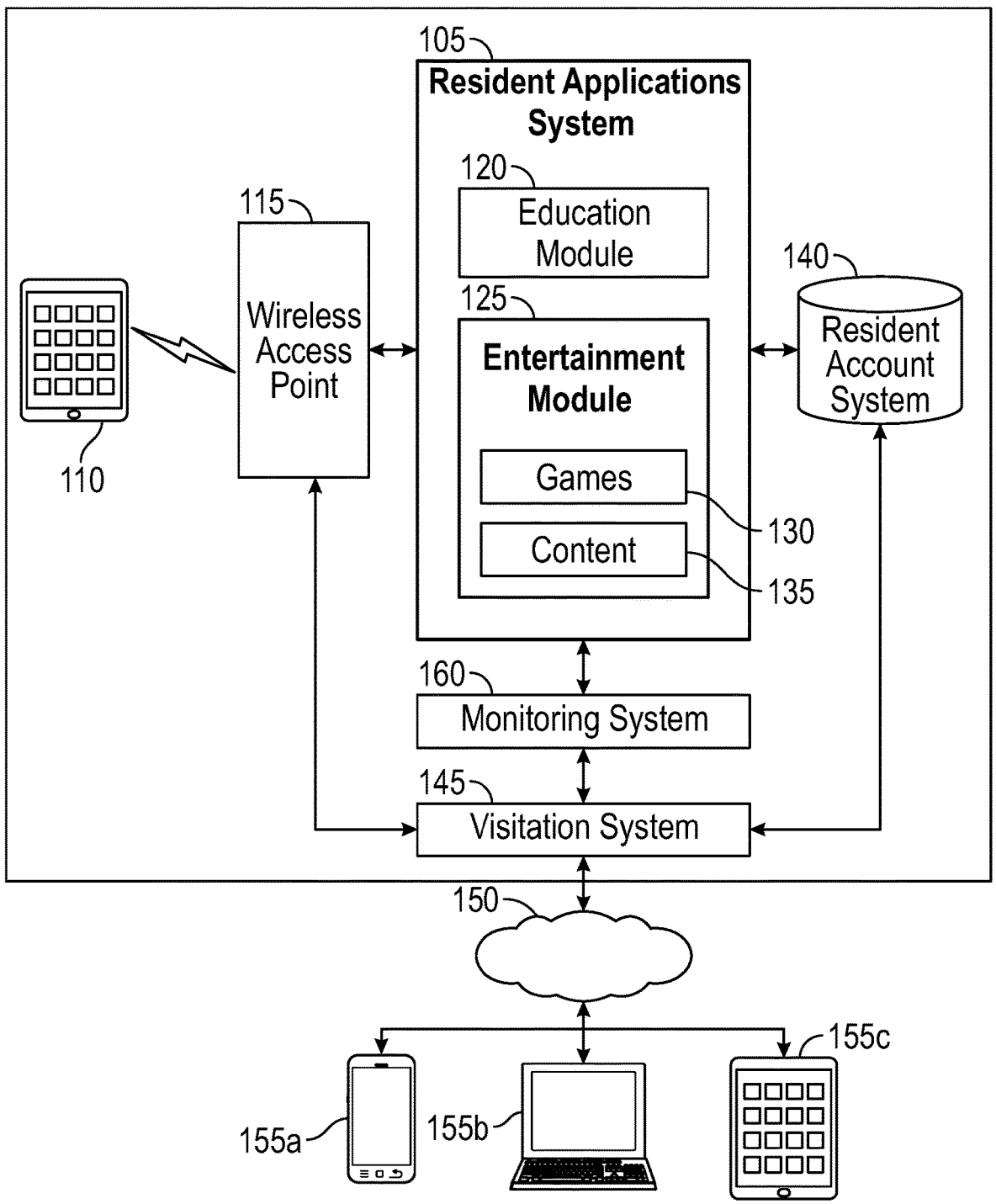

Having thus described the invention in general terms, reference will now be made to the accompanying drawings, which are not necessarily drawn to scale, and wherein:

FIG. 1 is a diagram illustrating certain components of a system according to various embodiments for controlling the availability of features of communications devices provided to residents of a controlled-environment facility.

Figure 2:
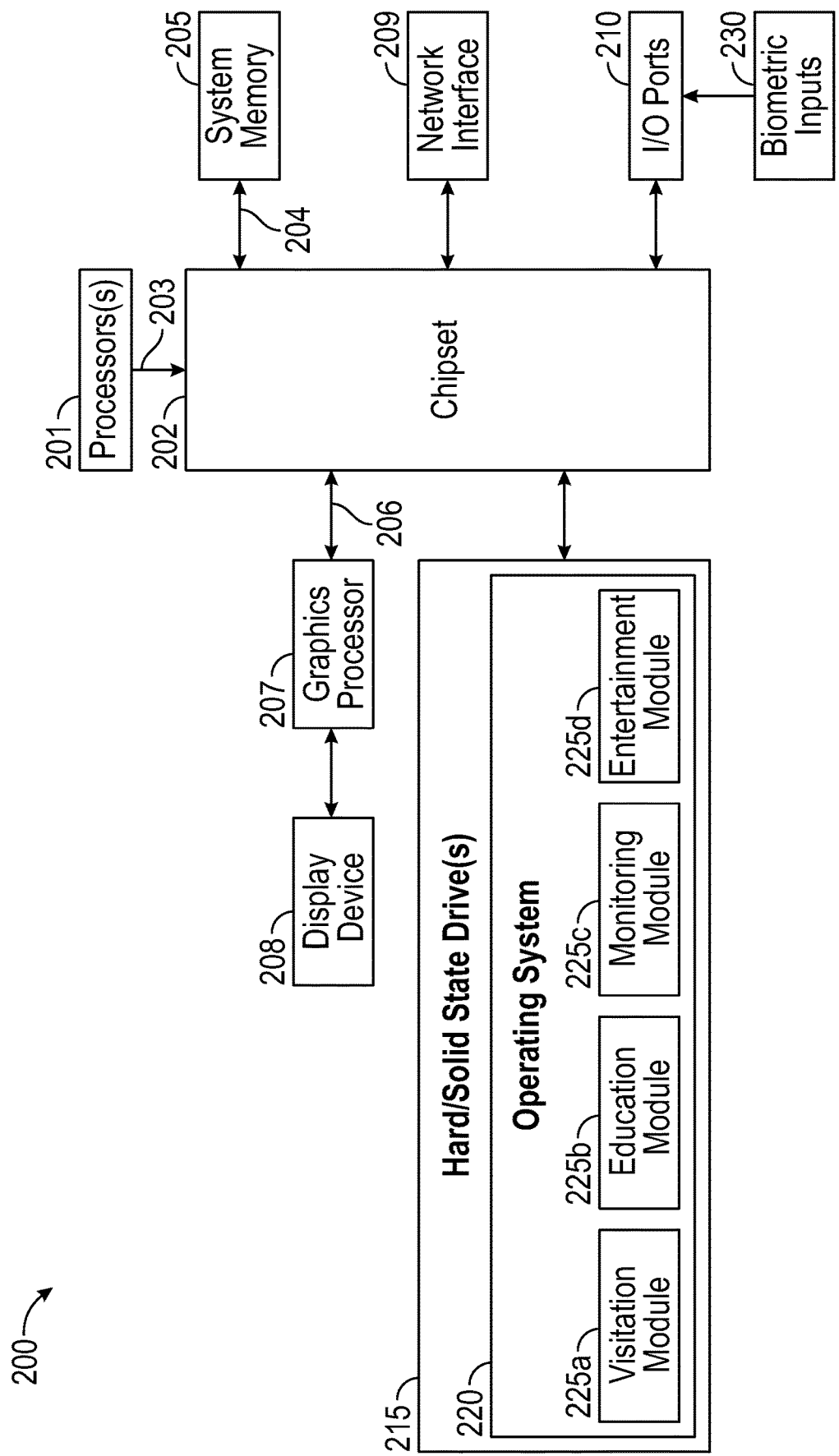

FIG. 2 is a diagram illustrating certain components according to various embodiments of a portable communications device provided to residents of a controlled-environment facility.

Figure 3:
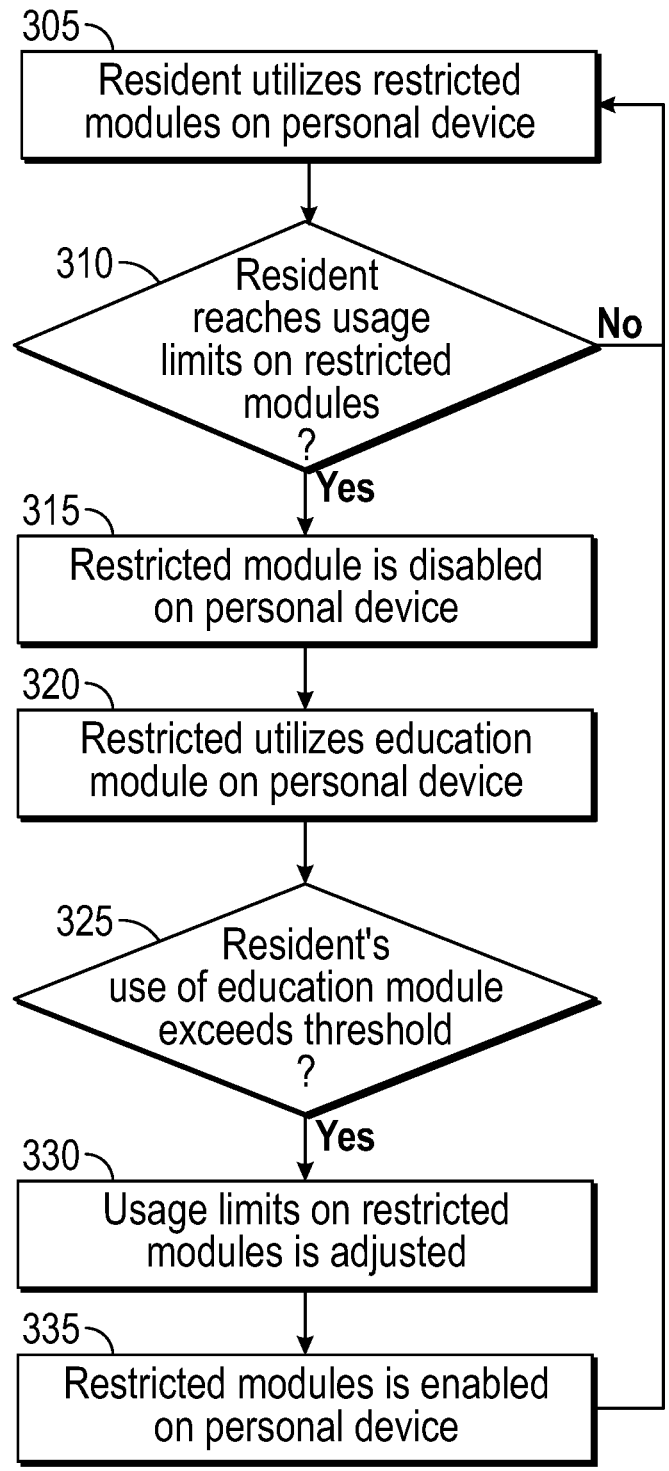

FIG. 3 is a flowchart diagram illustrating certain steps of process according to various embodiments for controlling the availability of features of communications devices provided to residents of a controlled-environment facility.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, embodiments may be implemented within various types of controlled-environment facilities, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), certain healthcare facilities (e.g., certain hospitals and nursing homes, certain mental health facilities, certain rehabilitation facilities, such as drug and alcohol rehabilitation facilities, etc.), certain restricted living quarters (e.g., barracks, certain dormitories, etc.), certain educational facilities, and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

FIG. 1 is a diagram illustrating certain components of a resident communications system 100 provided within a controlled-environment facility according to various embodiments. In a controlled-environment facility, the resident communications system 100 may provide residents with a variety of services. In certain instances, the resident may utilize the services provided by the resident communications system 100 via a portable communications device 110. In the illustrated embodiment, resident communications system 100 provides residents with visitation session services via a visitation system 145, where the resident may utilize certain of these visitation session services via portable communications device 110. As illustrated, resident communications system 100 also provides residents with a resident applications system 105 that interfaces with the portable communications device 110 in order to provide various approved software applications to the resident, such as educational software and entertainment software. In various embodiments, resident communications system 100 may provide residents with a variety of additional services via a portable communications device 110.

In certain embodiments, resident communications system 100 may be located within a controlled-environment facility and may be used to provide communications services to residents located at that particular facility. Alternatively, resident communications system 100 may be centrally and/or remotely located with respect to one or more controlled-environment facilities and be used to provide services to residents at multiple different facilities. Whether local to a particular controlled-environment facility or located remotely, resident communications system 100 may be used to provide communication services to residents of multiple controlled-environment facilities.

One of the services provided to residents by the resident communications system 100 is monitored visitation sessions. In the illustrated embodiment, visitation system 145 allows a resident, using portable communications device 110, to participate in a visitation session with a nonresident participating via a communications device 155a-c that connects to the visitation system 145 via an external network 150, such as the Internet. In various embodiments, the visitation system 145 may provide residents with a selection of different visitation session formats including audio conferences, audio messages, video conferences, video messages, email, online chats and/or text messaging services. In certain instances, the visitation formats available to a resident may depend on factors such as: the capabilities of the portable communications device 110, the resident's designated privilege classification within the controlled-environment facility, and restrictions on types of visitations that are allowed with specific nonresidents.

In the illustrated embodiment, the resident communications system 100 utilizes the resident account system 140 in enforcing security protocols that are applicable to the use of services provided to residents of the controlled-environment facility. For instance, in providing visitation services, the visitation system 145 may determine applicable restrictions based on data stored in the resident account system 140. In certain embodiments, the visitation system 145 may interoperate with the resident account system 140 to limit a resident's visitation sessions to sessions with non-residents whose identities are listed in that resident's Pre-Approved Contact (PAC) and/or Personal-Allowed Number (PAN) list. In some scenarios, the visitation system 145 may also enforce restrictions prohibiting a resident from contacting certain individuals identified in a "do not contact" list. The identity of a non-inmate may be represented on these lists by the phone number of the non-resident, the device presented for use by a non-resident and/or the email addresses or other accounts used by the non-resident. Each resident's PAC, PAN, and/or do not contact list(s) may be stored by the resident account system 140. In certain scenarios, resident account system 140 may also be used to store biometric information used to authenticate individual residents of the controlled-environment facility and/or non-residents that have been authorized for certain visitation system 145 services. In addition to PAC, PAN, and/or do not contact list(s), resident account system 140 may also store other security profiles and rules that are applicable to each resident.

The resident account system 140 may also be used to manage information such as balances in a resident's trust, commissary and/or visitation services accounts. The resident account system 140 may also provide access to other information pertaining to a resident, including for instance a resident's trial schedule, conviction data, criminal record, sentencing data (such as time served, time remaining to be served, and projected release date), cell and cellmate assignments, resident-specific restrictions and warnings, commissary order history, telephone call history, call recordings, known or suspected gang or criminal affiliations, known or suspected affiliates, accomplices, or gang members; and any other information that may be relevant or useful to correctional facility staff to house and maintain residents. In various embodiments, the resident account system 140 may be one or more separate systems, or may be integrated as a component of the resident communications system 100.

Subject to various restrictions and limitations enforced by the visitation system 145, residents may participate in visitation sessions with one or more non-residents 155a-c. Nonresidents may utilize various communications devices in participating in visitation sessions. For instance, a non-resident may participate using a mobile phone 155a, tablet computing device 155c, a personal computer 155b or other communications device capable of interfacing with the visitation system 145. In certain scenarios, a non-resident may participate in a voice visitation session hosted by the visitation system 145 via a traditional telephone via a Publicly Switched Telephone Network (PSTN) interface to the network 150. As described, various other visitation session formats may be supported by visitation system 145. Based on the hardware and software capabilities of the nonresident devices 155a-c, nonresidents may participate in voice, video and/or written (e.g., text, chat, email) visitation sessions.

In the illustrated embodiment, resident communications system 100 includes a monitoring system 160 configured to perform various monitoring operations related to the resident's use of the services provided by the system. In particular, the tools provided by the monitoring system provide the ability to monitor resident's use of software applications provided via the resident applications system 105. The monitoring system 160 also provides various tools for automated and manual monitoring of visitation sessions conducted via the visitation system 145. The monitoring system 160 may include tools that allow staff to monitor live and recorded visitation sessions. The monitoring system 160 may record the visitation sessions conducted via the visitation system 145, such as by generating written transcripts, audio and/or video files of the visitation session. These recorded visitation sessions may be stored to a database maintained by the monitoring system 160. The monitoring system 160 may also provide tools that allow staff to mark and annotate events observed in a recorded visitation session. The monitoring system 160 may also provide tools that allow staff to search recorded visitation sessions in support of investigative activities. Additional monitoring may be provided by the monitoring system 160 via keyword detection, gesture recognition, and other tools intended to detect unauthorized or illicit behavior during a visitation session.

In certain embodiments, portable communications device 110 may be a personal wireless device, such as a tablet device or a smartphone device. As described in additional detail with regard to the embodiment of FIG. 2, the portable communications device 110 may include a camera, display, microphone and speakers and may allow the resident to participate in visitation sessions supported by the visitation system 145, where such visitation sessions may include voice visitations, video sessions, email, online chats and/or text messaging services. In certain scenarios, a portable communications device 110 may be referred to as an Intelligent Resident Device (IRD), or in a correctional institution environment, as an Intelligent Inmate Device (IID). In certain scenarios, a portable communications device 110 may be sponsored, or otherwise subsidized, by organizations or companies that have contracted with the controlled-environment facility to provide services to residents of the facility.

The portable communications device 110 may be especially adapted in various manners for use in a controlled-environment facility. For instance, in a correctional facility, the portability of a portable communications device 110 may be limited by mounting or otherwise attaching the device on a wall, within a booth or as part of a kiosk. As described in additional detail with regard to the embodiment of FIG. 2, the portable communications device 110 may include various adaptations that prevent unauthorized use of the device by residents. Such adaptations may include various restrictions on the resident's use of services provided by the resident communications system 100. The portable communications device 110 may be assigned for use by a resident on a temporary or permanent basis.

A portable communications device 110 may be restricted with respect to the network connectivity that is provided by the resident communications system 100. In many scenarios, a portable communications device 110 may be configured to connect only to a specific wireless access point 115, or a specific network of wireless access points, provided by the resident communications system 100. In certain embodiments, a portable communications device 110 may be further restricted to connect only to networks available within certain areas of a controlled-environment facility, such as a dedicated visitation area or other supervised area. In certain scenarios, network connectivity for a portable communications device 110 may be limited by placing wireless access points 115 and positioning directional antenna within the physical structure of a controlled-environment facility such that the generated wireless signals are restricted to limited areas within the facility.

As illustrated, the resident applications system 105 includes an education module 120 and an entertainment module 125. These modules are software applications provided for use by residents and which may be utilized via a portable communications device 110. The education module 120 may be one of many different modules provided for the education, training and counseling of residents. For instance, the education module 120 may provide a resident with access to recorded lectures, online classes, coursework materials, self-guided training courses, vocational training materials, job counseling services, job search services, counseling services and other such resources provided with the intent to rehabilitate and educate residents. Accordingly, the use of such educational resources by residents may be incentivized in order to encourage additional use of these resources. Various embodiments may designate various other software modules as incentivized modules similar to the described education module 120.

In addition to providing educational resources, the resident applications system 105 may include an entertainment module 125, by which entertainment software programs may be downloaded and run on a portable communications device 110. In the illustrated embodiment, entertainment module 125 is comprised of a gaming module 130 and content module 135. The gaming module 130 may support the use of various games approved for residents of a controlled-environment facility. In certain scenarios, residents with particular privilege status classifications may be allowed access to certain games that are otherwise unavailable to other residents. The entertainment module 125 also includes a content module 135 that may be used to provide residents with various forms of content, such as recorded videos, live broadcasts, music files, access to streaming audio, and other audio and video content approved for residents of a controlled-environment facility. In certain embodiments, the content available to a particular resident may depend on a privilege status classification of the resident. For instance, residents having earned additional privileges may be allowed access to additional content via content module 135. As described with regard to the following embodiments, access to the software modules supported by the resident applications system 105 may be controlled based on the designation of each software module as an incentivized module, such as education module 120, or restricted module, such as the entertainment module 125.

In the embodiment of FIG. 1, the resident application system 105 is a component of the resident communications system 100. In certain embodiments, the resident application system 105 may be an external component of the resident communications system 100. In certain embodiments, one or more of the functions of the resident application system 105 may be provided by systems external to the resident communications system 100. In certain of such embodiments, one or more of the functions of the resident application system 105 may be provided by centralized systems external to the controlled-environment facility.

FIG. 2 is a block diagram of a portable communications device 200 configured according to certain embodiments for use by a resident of a controlled-environment facility. In particular, the portable communications device 200 may be configured such that access to features of the device may be controlled based on the resident's use of the device. In particular, access to restricted features of the portable communications device 200 may be based on the resident's use of features that have been designated as incentivized features, the use of which may result in the allotment of additional time for the resident's use of the restricted features.

In certain scenarios, the portable communications device 200 may be a tablet or similar device that allows residents to utilize services provided by a resident communications system, such as described with respect to FIG. 1. The portable communications device 200 may be configured to interoperate with the resident communications system to utilize software applications that have been approved, and in some cases modified, for use by residents of a controlled-environment facility. Also as described with regard to FIG. 1, in certain embodiments, the resident communications system may be configured such that the resident may utilize the portable communications device 200 to participate in visitation sessions, including audio and/or voice visitation sessions.

In certain embodiments, the portable communications device 200 may be a tablet device that is protected within a hardened case that prevents any modifications to the hardware of the device and also prevents any tampering with the device that could allow a resident to conceal contraband within the device. Various features of the hardware and/or software of the portable communications device 200 may be modified in order to prevent unauthorized use of the device. In certain embodiments, one or more sensors may be integrated into the portable communications device 200 in order to detect any such attempts to compromise the enclosure of the device. In certain embodiments, the portable communications device 200 may be configured to issue an alert to the resident communications system if the sensors indicate any attempts by a resident to compromise the enclosure of the device. In certain embodiments, the portable communications device 200 may be configured to shut down upon the sensors detecting an attempt to compromise the device, or in response to the sensors detecting sudden movements indicative of a resident's rough handling of the device.

Portable communications device 200 may include one or more processors 201. In various embodiments, the portable communications device 200 may be a single-processor system including one processor 201, or a multi-processor system including two or more processors 201. Processor(s) 201 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

Portable communications device 200 includes a chipset 202 that may include one or more integrated circuits that are connected to processor(s) 201. In certain embodiments, the chipset 202 may utilize a QPI (QuickPath Interconnect) bus 203 for communicating with the processor(s) 201. Chipset 202 provides the processor(s) 201 with access to a variety of resources. For instance, chipset 202 provides access to system memory 205 over memory bus 204. System memory 205 may be configured to store program instructions and/or data accessible by processors(s) 201. In various embodiments, system memory 205 may be implemented using any suitable memory technology, such as static RAM (SRAM), synchronous dynamic RAM (SDRAM), nonvolatile/Flash-type memory, or any other type of memory.

Chipset 202 may also provide access to a graphics processor 207. In certain embodiments, graphics processor 207 may be comprised within a video or graphics card that has been installed as components of the portable communications device 200. Graphics processor 207 may be coupled to the chipset 202 via a graphics bus 206 such as provided by an AGP (Accelerated Graphics Port) bus, a PCIe (Peripheral Component Interconnect Express) bus. The graphics processor 207 generates display signals that are provided to a display device 208, such as a tablet display screen. In certain embodiments, the display device 208 may be a touchscreen display configured to receive manual inputs, such as finger gestures and/or stylus inputs.

In certain embodiments, chipset 202 may be coupled to a network interface 209, such as provided by a Network Interface Controller (NIC). In certain embodiments, the network interface 209 may be coupled to the chipset 202 via a PCIe bus. As described, a device used by residents, such as portable communications device 200, may be limited with regard to the network connectivity that is supported. In such embodiments, the network interface 209 may be configured to restrict the networks to which the portable communications device may be connected. For instance, network interface 209 may be a wireless network adapter that is configured to allow the portable communications device 200 to connect only to a specific wireless network provided by the resident communications system. In certain embodiments, network interface 209 may be configured to issue and alert notifying the resident communications system if any unrecognized wireless networks are detected by the portable communications device 200.

In many scenarios, use of a portable communications device 200 may be limited based on security protocols implemented by the resident communications systems. For instance, the operating system 220 of the portable communications device 200 may be configured to require a resident to enter a PIN (Personal Identification Number) assigned to the resident before enabling use of the portable communications device 200 by the resident. In other embodiments, the portable communications device 200 may likewise remain disabled until a resident trying to use the device is authenticated via a biometric verification. In certain embodiments, the portable communications device 200 may be configured to disable certain functions of the device or of the resident software applications installed on the device until the resident is authenticated, such as using voice print recognition of a voice sample provided by the resident in response to a prompt generated by the operating system 220. In the illustrated embodiment, the chipset 202 is configured to utilize I/O ports 210 that support biometric input devices 230, such as a fingerprint reader or a retinal scanner. In certain embodiments, the operating system 220 may boot upon initialization of the portable communications device 200, but may require authentication of the resident via biometric inputs 230 in order to enable the resident's use of the portable communications device 200.

The chipset 202 of the portable communications device 200 may also include one or more hard disk and/or solid state drives 215. As illustrated, the operating system 220 of the portable communications device 200 may be stored in the hard disk and/or solid-state drive 215. The portable communications device 200 may be configured to operate using a specially-adapted operating system 220, or operating system kernel, that implements various security procedures, such as the described authentication of the resident using a voice print, fingerprint or other biometric input recognition. The operating system 220 of the portable communications device 200 may also restrict the software applications and services that may be used by a resident. The operating system 220 may also be configured to prevent the resident from installing or modifying any applications on the device, thus limiting the resident to the use of software programs authorized for use by the resident communications system.

As illustrated, upon booting of the portable communications device 200, and instantiation and execution of the operating system instructions 220 stored in the storage drive 215, the operating system 220 provides the resident with access to various software modules 225a-d. The software modules supported by operating system 220 include an education module 225b that provides residents with access to various educational services and resources. These educational services and resources provided via the education module 225b may include various forms of instructional materials, course materials, self-guided learning exercises, access to online classes, training materials, counseling materials and/or vocational training exercises. In various embodiments, the services provided via the education module 225b may provide residents with various types of resources that promote the education and the personal well-being of the resident. Accordingly, a controlled-environment facility may seek to promote the use of modules such as education module 225b by residents.

In order to incentivize the use of the education module 225b by residents, the operating system 220 may be configured to provide a resident with additional use of restricted software modules based on the resident's completion of educational or training programs offered by the education module 225. For instance, residents may desire additional use of restricted software modules provided by the operating system 220, such as use of an entertainment module 225d, or additional visitation sessions conducted via visitation module 225a. As described with respect to FIG. 1, the resident communications system may support the use of resident applications, such as the education module and entertainment module, which may be downloaded and run on the portable communications device 200.

An authenticated resident may use features of the operating system 220 to request access to the supported software modules 225a-d. In certain embodiments, the operating system 220 may connect to the resident applications system in order to authorize a resident's use of the requested module. In scenarios where a resident requests use of an incentivized module, such as education module 225b, the operating system 220 may be configured to allow the resident relatively unlimited use of such incentivized services, subject to the rules and procedures enforced by the controlled-environment facility with regard to the times and duration that a resident is allowed to utilize a portable communications device 200. In scenarios where a resident requests use of a restricted-use module, such as the visitation module 225a and the entertainment module 225d, the operating system 220 may be configured to enforce various restrictions on the use of such modules. For instance, in response to a resident's request for use of the visitation module 225a, the operating system 220 may query the visitation system described in FIG. 1 in order to determine whether the resident has a scheduled visitation session or whether the resident's current visitation request is permitted based on the resident's allotted visitations and the applicable visitation schedule.

As described in additional detail with respect to FIG. 3, the operating system 220 may be configured to provide residents with additional access to certain modules, such as visitation module 225a and/or entertainment module 225d, based on the resident's use of an incentivized module, such as education module 225b. For instance, by completing portions of vocational training lessons provided via the education module, a resident may be provided with additional use of the entertainment module 225b, thus allowing the resident to utilize software applications, such as the games and content described with respect to FIG. 1.

In various embodiments, a portable communications device 200 does not include each of the components shown in FIG. 2. In various embodiments, a portable communications device 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 201 as a systems-on-a-chip.

FIG. 3 is a flowchart diagram illustrating certain steps of a process according to various embodiments, where the process begins at step 305 with the resident's use of a personal communications device to access restricted software modules. For instance, as described with respect to FIG. 1, the resident communications system may provide access to an entertainment module that provides software applications, such as games and audio content that may be used by the resident on a restricted basis. The restrictions may take the form of time limits on the resident's use of these applications. For example, a resident may be allowed use of a gaming module, but may be restricted to a certain number of hours of use of the module per day. Also as described, the personal communications device of the resident may include a visitation module that is restricted with regard to the times and duration of its use by the resident.

At step 310, the resident's use of such restricted software modules is monitored and compared to applicable usage limits. In certain embodiments, the resident communications system may enforce different limits for each software module. The resident communications system may also enforce individualized limits for specific residents. In certain embodiments, the resident communications system may enforce different limits depending on the type of personal communications device utilized by a resident. The limits enforced on visitation sessions may be additionally limited based on rules and procedures enforced by the controlled-environment facility with regard to the times and durations during which visitation sessions may be conducted.

If a resident reaches a prescribed usage limit for a restricted software module, at step 315, the restricted software module is disabled on the personal communications device of the resident. In certain embodiments, the disabling of a software module prevents any further use of the module by the resident, until the module is re-enabled. For certain modules, such as a visitation system module, only certain features of the module may be disabled. For instance, upon reaching applicable limits on visitation sessions, a resident may be prevented from initiating or otherwise participating in any additional visitation sessions, but may be allowed to view a schedule of upcoming visitations, issue requests for additional visitations, and/or playback recorded messages.

As described, certain other software modules supported by the resident communications system, such as an education module, may be incentivized modules that residents may be encouraged to utilize. At step 320, a resident utilizes such an incentivized software module, such as by completing educational coursework. In certain embodiments, an incentivized module may remain enabled on the personal communications device at all times the resident is allowed to utilize the device. In other embodiments, certain limitations may be placed on the use of an incentivized software module. The personal communications device may track the resident's use of such incentivized modules, such as by tracking the time spent using the education module and by tracking the completion of specific tasks defined within the education module. In certain embodiments, the incentivized software module may be configured to report the completion of certain milestones by the resident.

At step 325, the resident's use of an incentivized software module is compared to a threshold in order to determine whether to grant additional use of a restricted software module. In certain embodiments, the use of an incentivized software module may be tracked based on the time spent by the resident using the module. If the resident's use of an incentivized module surpasses a specified time threshold, additional use of a restricted software module may be granted. In certain embodiments, threshold usage of an incentivized module may be determined based on milestones reported by the incentivized module. For instance, an education module may report the completion of courses by a resident, where reporting of such milestones may be conditioned upon the resident correctly answering questions designed to test competency with regard to the course material. In certain scenarios, better performance on such test may be indicated by the milestones reported by the education module and may result in the allotment of additional use of a restricted software module.

If the resident's use of the incentivized software module is determined to have surpassed a specified threshold, at step 330, the usage limits for restricted software modules may be adjusted. In certain embodiments, the adjustment of the usage limits for a restricted software module may be accompanied, at step 335, with enablement of the restricted software module on the personal communications device of a resident. In certain scenarios, the restricted software module may remain enabled, such as in scenarios where the resident has not reached a usage limit on that restricted software module. In such cases, the adjustment of usage limits on an enabled module serves to authorize additional use of the restricted software module by the resident. In certain embodiments, the resident may be allowed to immediately use the enabled software module for the adjusted usage limit specified at step 330, such as authorizing the resident to listen to music or play games.

In embodiments where the use of incentivized software modules may allow a resident to earn additional visitation time, the adjustment may take numerous forms. In certain scenarios, the adjustment of limits on the use of a visitation module may allow a resident to schedule an additional time-limited visitation session to be conducted via the visitation module. In other scenarios, the adjustment of limits on the use of a visitation module may allow a resident to extend the duration for an already scheduled upcoming visitation session. In other scenarios, the adjustment to the use of a visitation module may allow a specific number of additional visitation communications, such as text messages, voice messages, and/or video messages.

The foregoing has outlined rather broadly the features and technical advantages of the present invention in order that the detailed description of the invention that follows may be better understood. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A communications device for providing services to a resident of a controlled-environment facility, the device comprising:
a network interface configured to establish a connection with a resident communications system via one or more wireless access points installed within the controlled-environment facility;
a memory device configured to store operating system program instructions; and
one or more processors configured to execute the operating system program instructions, causing the communications device to:
connect with the resident communications system to provide the resident with use of a first software module;
monitor use of the first software module by the resident;
determine whether use of the first software module exceeds a first threshold;
set a daily usage limit for a second software module;
determine whether use of the second software module by the resident has exceeded the daily usage limit for the second software module;
disable use of the second software module by the resident if the daily usage limit for the second software module has been exceeded;
determine if use of the second software module for a first duration would cause the user to exceed the daily usage limit for the second software module; and
enable use of the second software module by the resident for the first duration, when use of the first software module exceeds the first threshold and use of the second software module for the first duration will not exceed the daily usage limit for the second software module.

2. The communications device of claim 1, wherein the first software module is an education module.

3. The communications device of claim 1, wherein the second software module is an entertainment module.

4. The communications device of claim 1, wherein the second software module is a visitation module.

5. The communications device of claim 4, wherein the first duration allows the resident to participate in a visitation session with a non-resident of the controlled-environment facility.

6. The communications device of claim 1, further comprising:
a biometric input device configured to capture a biometric indicator presented by the resident, wherein an operating system is configured to require authentication of the resident via the biometric indicator in order to enable use of the operating system by the resident.

7. A system for providing a resident of a controlled-environment facility with communication services, the system comprising:
one or more wireless access points coupled to a resident communications system;
a communications device assigned to the resident, wherein the communications device is configured to connect to the resident communications system via the one or more wireless access points; and
the resident communications system is configured to:
provide the resident with use of a first software module on the communications device;
monitor use of the first software module by the resident;
determine whether use of the first software module exceeds a first threshold;
determine whether use of a second software module by the resident has exceeded a daily usage limit;
disable use of the second software module by the resident if the daily usage limit for the second software module has been exceeded;
enable use of the second software module by the resident if the daily usage limit for the second software module has not been exceeded, when use of the first software module exceeds the first threshold; and
provide the resident with use of the second software module for a first duration, wherein the first duration will not cause the user to exceed the daily usage limit.

8. The system of claim 7, wherein the communications device is configured to connect only to the one or more wireless access points.

9. The system of claim 7, wherein the first software module is an education module.

10. The system of claim 7, wherein the second software module is an entertainment module.

11. The system of claim 7, wherein the second software module is a visitation module.

12. The system of claim 11, wherein the first duration allows the resident to participate in a visitation session with a non-resident of the controlled-environment facility.

13. The system of claim 7, wherein the communications device further comprises a biometric input device configured to capture a biometric indicator presented by the resident, wherein an operating system is configured to require authentication of the resident via the biometric indicator in order to enable use of the operating system by the resident.

14. A method for providing a resident of a controlled-environment facility with communication services, the method comprising:
providing a wireless network within a portion of the controlled-environment facility via one or more wireless access points coupled to a resident communications system;
assigning a communications device to the resident, wherein the assignment comprises configuration of an operating system of the communications device to require authentication of the resident in order to use the operating system;
configuring a connection, when the resident is authenticated, between the resident communications system and the communications device via the one or more wireless access points;
providing the resident with use of a first software module on the communications device;
monitoring use of the first software module by the resident;
determining whether use of the first software module exceeds a first threshold;
setting a daily usage limit for a second software module;

determining whether use of the second software module by the resident has exceeded the daily usage limit for the second software module;

disabling use of the second software module by the resident if the daily usage limit for the second software module has been exceeded;

determining if use of the second software module for a first duration would cause the user to exceed the daily usage limit for the second software module; and enabling use of the second software module by the resident for the first duration, when use of the first software module exceeds the first threshold and use of the second software module for the first duration will not exceed the daily usage limit for the second software module.

15. The method of claim 14, wherein the communications device is configured to connect only to the one or more wireless access points.

16. The method of claim 14, wherein the first software module is an education module.

17. The method of claim 14, wherein the second software module is an entertainment module.

18. The method of claim 14, wherein the second software module is a visitation module.

19. The method of claim 18, wherein the first duration allows the resident to participate in a visitation session with a non-resident of the controlled-environment facility.

20. The method of claim 14, wherein the communications device further comprises a biometric input device configured to capture a biometric indicator presented by the resident, wherein the operating system is configured to require authentication of the resident via the biometric indicator in order to enable use of the operating system by the resident.

* * * * *